UNITED STATES PATENT OFFICE.

HENRY DREYFUS, OF LONDON, ENGLAND.

MANUFACTURE OF COMPOSITIONS, PREPARATIONS, OR ARTICLES HAVING A BASIS OF CELLULOSE ACETATE.

1,353,385. Specification of Letters Patent. Patented Sept. 21, 1920.

No Drawing. Application filed April 15, 1919. Serial No. 290,317.

*To all whom it may concern:*

Be it known that I, HENRY DREYFUS, a citizen of the Swiss Republic, residing at London, England, have invented certain new and useful Improvements in or Relating to the Manufacture of Compositions, Preparations, or Articles Having a Basis of Cellulose Acetate, of which the following is a specification.

In the specification of another application for U. S. A. Patent S. No. 290,316 filed Apr. 15, 1919, I have described a process for the manufacture of non-inflammable celluloid, films, dopes, artificial silk or other compositions, preparations or articles having a basis of cellulose acetate, said process being characterized by the employment of certain special plastic-inducing solvents therein specified, namely mixtures of isomeric xylenemonomethylsulfonamids, mixtures of isomeric xylenedimethylsulfonamids or mixtures of isomeric xylenemonoethylsulfonamids, made from crude or commercial xylene, the said substances representing mixtures of the isomeric alkylated amids (of o, m and p-xylene sulfonic acids) such as can be obtained by treating an ordinary commercial xylene (which distils for example about 135° to 146° C. and as is well known contains o, m and p-xylenes) by the ordinary methods of conversion into the alkyl-sulfonamids, for example by treating the crude xylene with chlorosulfonic acid to form the corresponding sulfochlorids and then with ammonia to convert these into the sulfonamids and then methylating same to the mono or dimethyl stage or ethylating to the monoethyl stage; or by treating the said mixed sulfochlorids with amins such as methylamin, ethylamin, etc.

In my said specification the conditions which should be fulfilled by high boiling solvents or plastic-inducing agents are set out. These are shortly that such agents should have high boiling points, for instance above 300° C.; that they should not be solid bodies at ordinary temperature at most, that they should be true solvents of cellulose acetate, be insoluble or very little soluble in water, neutral and not liable to become acid or alkaline by boiling with water.

According to the present invention I employ as plastic-inducing agents for the manufacture of uninflammable celluloid, films, dopes, or any other compositions of matter as before referred to, high boiling ortho and para toluenemonomethylsulfonamid-containing mixtures or ortho and para toluene-monoethylsulfonamid-containing mixtures such as can be obtained on treating crude or commercial toluene (which distils for example about 95° to 132° C.) by the ordinary methods of conversion into the alkyl sulfonamids, for example by treating the crude toluene with chlorosulfonic acid to form the corresponding sulfochlorids, treating the resulting raw mixture with ammonia to convert the sulfochlorids into sulfonamids, and then methylating or ethylating to the monomethyl or monoethyl stage; or by treating the said raw mixture with amins such as methylamin, ethylamin, etc. Pure toluene o-monomethyl sulfonamid and pure toluene-p-monomethyl sulfonamid are solid bodies at ordinary temperature (Richter, *Lexikon der Kohlenstoffverbindungen*, Teil I, 1074) and are unsuitable for the purposes of the invention.

The aforesaid plastic-inducing agents of the present invention, representing mixtures containing o and p-toluene mono-methyl or monoethyl sulfonamids, which sulfonamids are hereinafter in the claiming clauses referred to as o- and p toluene mono-low-carbon alkyl sulfonamids, are both liquid substances at ordinary temperature, having high boiling points and which fulfil the requirements before mentioned. Naturally any mixtures of them can be employed or mixtures of them with other plastic-inducing bodies and the claims are to be read accordingly.

The plastic-inducing agents of the present invention are preferably employed in conjunction with any usual or suitable solvents or liquids of low boiling point for effecting the mixture of the mass or composition to be worked or produced as for example acetone, methyl or ethyl acetate and alcohol or their mixtures.

Triphenylphosphate, tricresylphosphate or similarly acting agents may be employed in conjunction with the plastic-inducing agents for further reducing combustibility as referred to in my said specification.

Likewise I may employ in conjunction with the plastic-inducing agent with or without the triphenyl- or tricresylphosphate or similarly acting substances, aliphatic derivatives of urea which are either liquid or have a low melting point, such as monomethylurea, dimethylurea, trimethylurea, monoethylurea, diethylurea and so forth, for the purpose of neutralizing any trace of acid which may be developed in the mass, composition or product. Such urea derivatives may be employed in the quantities usual for urea.

Naturally in making the solutions, masses or mixtures with the solvent plastic inducing agents of the present invention any usual or suitable substances may be added.

What I claim and desire to secure by Letters Patent is:

1. A composition of matter containing cellulose acetate and, containing a high-boiling mixture comprising ortho- and para-toluene low-carbon-alkyl sulfonamids, which mixture is liquid at ordinary temperature.

2. A composition of matter containing cellulose acetate and, containing a high-boiling mixture comprising ortho and para toluene monoethylsulfonamids, which mixture is liquid at ordinary temperature.

In testimony whereof I have hereunto subscribed my name.

HENRY DREYFUS.